UNITED STATES PATENT OFFICE.

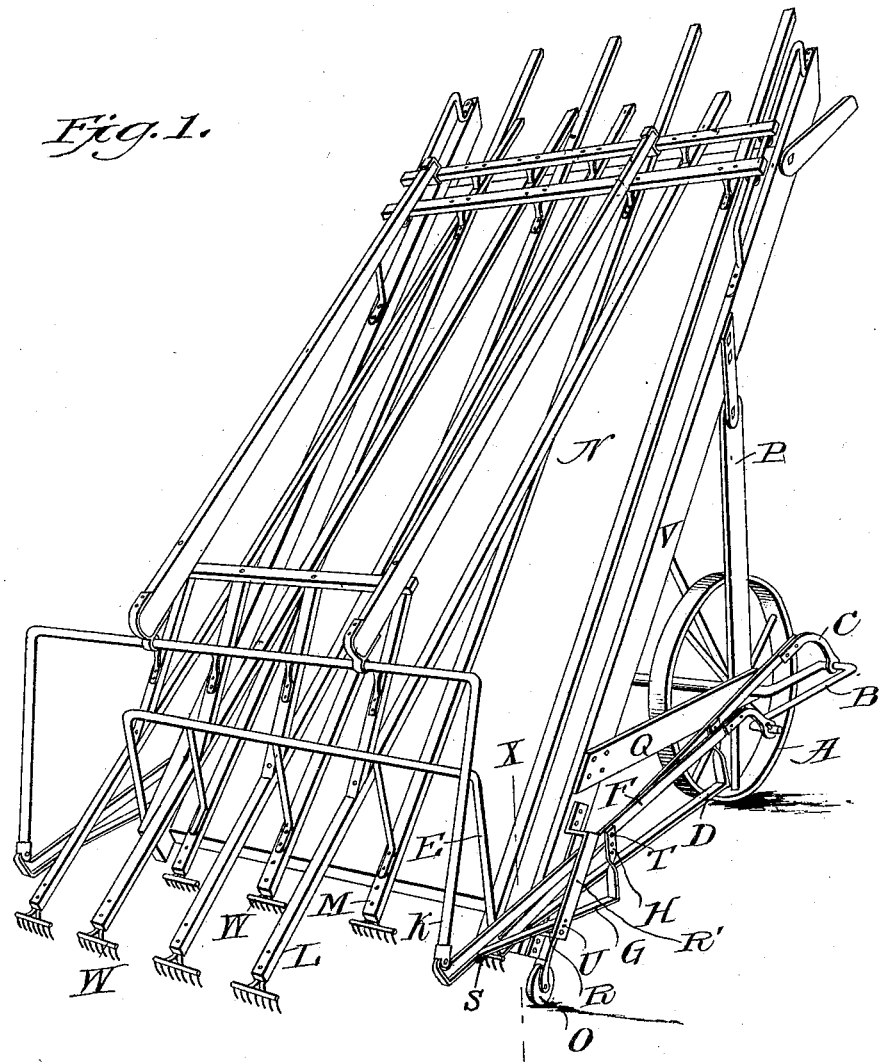

THOMAS P. CORWIN, OF KENTON, OHIO.

HAY-LOADER.

1,103,942.

Specification of Letters Patent. Patented July 21, 1914.

Application filed August 7, 1911. Serial No. 642,814.

*To all whom it may concern:*

Be it known that I, THOMAS P. CORWIN, a citizen of the United States, residing at Kenton, in the county of Hardin and State of Ohio, have invented a new and useful Improvement in Hay-Loaders, of which the following is a specification.

My invention relates to, improvements in hay-loaders and more particularly to that class which are attached to and trail after a hay-wagon and which rake up the hay, elevate it, and discharge or load it on the hay-wagon, and consists in a series of rakes, having peculiar shaped pitmen and arches to carry the rakes L, M back and forth and also elevate the set moving to the rear and lowering the rear end of the set moving forward with a long sweep of the rakes W, over the ground, to gather and deliver the hay.

Figure 1, is a rear perspective view. Fig. 2, a rear view through parts of Fig. 1, on line $x$—$x$.

The construction of my machine is as follows: Mounted on the carrying wheels A, O, is an elevating platform N supported by standards P and brace Q and side sill V. The wheels A also serve as driving wheels, the axle being extended out beyond the wheel on each side forming double cranks B. The parts on each side, of my machine are duplicates though only one side can be shown. Attached to the two extreme points of the double crank B, are two pitmen C, F from the rear ends of which extend forward two L-shaped pieces D, G. These pieces are pivoted to the driving pitmen F, C at S, and are adjustable vertically at their forward ends, by pin T, that passes through holes H in the upright arm of the pieces D, G. The lower or more horizontal part of the pieces D, G serve as supports or tracks and travel back and forth on the rollers R, R to regulate the movements of the arches K, E' and the movements of the rake bars L, M attached to them. The rollers R are mounted in the brackets R' carried by the lower end portions of the platform, the brackets being provided with a row of openings U adapted to be selectively engaged by the shafts of the rollers to permit adjustment of the rollers to be made.

The operation of my device is as follows: The loader being attached to the rear of a hay wagon, the forward movement revolves the axle of wheel A, and the double crank arms B, reciprocate the parts C, F, the one going forward as the other goes backward. The pieces D, G, on the lower rear part of the driving arms or pitmen travel back and forth upon the rollers R, which also act as fulcrums or pivots for them, the rising and falling of the cranks above and below the center of the axle giving the rear ends of the driving arms or pitmen the necessary elevation in their backward movement, to pass over the ground, and lowering the set of rakes in their forward movement carrying the hay up onto the elevating platform and delivering the hay on the load or wagon. The rollers or fulcrums, R, are adjustable vertically in holes U in the brackets R' to raise the rakes in their backward movement to any desired height.

In my arrangement the vertical adjustment of roller fulcrum R is supplemental to the vertical adjustability of the track G. My track being adjustable in height by means of holes H and pins T, to draw the front ends of the track up nearer the pitman; or to lower the track farther beneath the pitman, gives the necessary adjustability, vertically, to the pitmen, bar arches and rakes to adapt them to raking ordinary hay from the swath. But, where the hay is very heavy, or where raking from the windrow, I raise the roller fulcrums higher in their supporting standards, thus throwing the rear end of the pitmen and rakes higher at the very beginning of the backward stroke, to carry them over the windrow, or heavy swath at much greater height than is usually done, thus overcoming the difficulty of getting the rakes, which are attached to the lower ends of the rake bars, back over heavy hay, in their backward and upward movements, without dragging the hay back. The teeth on the rake bars begin to relieve themselves of the hay immediately upon the completion of the forward stroke of the pitmen and rake bars, and do not rub the hay between the rake bars and the elevator platform, back and forth, crushing the hay, and breaking so many of the leaves and blossoms as is the case with so many loaders, thus making a much better quality of hay, the two adjustable properties supplementing each other, and also being independent of each other.

What I claim is:—

1. A hay loader comprising a platform provided with rakes, pitmen for actuating the rakes, means for operating the pitmen, brackets carried by the platform, rollers adjustably mounted in the brackets, and supports carried by the pitmen and movable over the rollers said supports having one end pivotally connected to the pitmen and the front end slidably connected to said pitmen, and means for securing the supports in various adjustments to the pitmen.

2. A hay loader comprising a platform provided with rakes, pitmen for operating the rakes, supports adjustably connected to the pitmen for adjusting the pitmen vertically, and rollers, over which the supports reciprocate, adjustably connected to the platform.

3. A hay loader comprising a platform provided with rakes, pitmen for operating the rakes, adjustable supports carried by the pitmen for adjusting the pitmen and rakes, vertically, and means carried by the platform and engaged by the supports for adjusting the positions of the pitmen and rakes at their initial rearward movement.

THOMAS P. CORWIN.

In presence of—
GEORGE E. CRANE,
THOMAS F. CORWIN.

Copies of this patent may be obtained for five cents each, by addressing the "Commissioner of Patents, Washington, D. C."